United States Patent [19]

Hartemann et al.

[11] 4,301,683
[45] Nov. 24, 1981

[54] ELASTIC SURFACE WAVE ACCELEROMETER

[75] Inventors: Pierre Hartemann; Jean-Paul Castera, both of Paris, France

[73] Assignee: Thomson-CSF, Paris, France

[21] Appl. No.: 97,662

[22] Filed: Nov. 27, 1979

[30] Foreign Application Priority Data

Nov. 30, 1978 [FR] France .................. 78 33804

[51] Int. Cl.³ ............................................. G01P 15/08
[52] U.S. Cl. ........................... 73/517 R; 73/516 LM
[58] Field of Search ........ 73/516 R, 516 LM, 517 R, 73/517 B, 517 AV; 310/313 R, 313 D, 328, 329, 338

[56] References Cited

U.S. PATENT DOCUMENTS

| | | | |
|---|---|---|---|
| 2,726,074 | 12/1955 | Ketchledge | 73/516 LM |
| 3,233,465 | 2/1966 | Tolliver et al. | 73/517 R |
| 3,479,886 | 11/1969 | Canfield | 73/516 LM |
| 3,646,818 | 3/1972 | Little et al. | 73/517 R |
| 3,911,388 | 10/1975 | Crump | 310/329 X |
| 3,978,731 | 9/1976 | Reeder et al. | 73/703 |
| 4,100,811 | 7/1978 | Cullen et al. | 310/338 |
| 4,199,990 | 4/1980 | Valdois et al. | 73/517 AV |

FOREIGN PATENT DOCUMENTS

| | | |
|---|---|---|
| 1447718 | 6/1966 | France . |
| 2262288 | 9/1975 | France . |
| 2334958 | 8/1977 | France . |
| 2396306 | 1/1979 | France ............... 73/517 AV |

OTHER PUBLICATIONS

"Surface-Acoustic-Wave Pressure & Temperature Sensors" by Raeder et al., from Proceedings of IEEE, vol. 64, No. 5, May 1976.

Primary Examiner—James J. Gill
Attorney, Agent, or Firm—Cushman, Darby & Cushman

[57] ABSTRACT

The invention relates to an accelerometer comprising at least one elastic plate propagating elastic surface waves, to which a normal force is applied resulting from the action of the acceleration which is to be measured on a solid or liquid body of predetermined mass. The measurement of the deviation in frequency of the oscillator of which the plate is a part gives an indication of the value of the normal component of the acceleration.

10 Claims, 6 Drawing Figures

ELASTIC SURFACE WAVE ACCELEROMETER

BACKGROUND OF THE INVENTION

The invention relates to accelerometers which make use of the propagation of elastic surface waves.

In order to measure acceleration of a given direction, it is known to cause it to act on an elastic body propagating surface waves. When this body is part of an oscillator, the oscillation frequency varies with the acceleration with a sensitivity which depends on the angle between the acceleration and the section axes of the elastic body. The mechanical stresses produced in the elastic body differ according to the directions of acceleration in relation to the direction of propagation of the surface waves. In order to carry out valid measurements, it is essential to know the exact direction of the acceleration which is to be measured, as the apparatus responds to all the components thereof.

BRIEF SUMMARY OF THE INVENTION

The aim of the invention is to measure a component of the acceleration having a well-determined direction, with the apparatus not responding to the other components. For this purpose, instead of imposing the acceleration directly on a substrate in the form of a fairly thick block, there is used as the medium for transmitting the elastic surface waves a very thin plate which is deformed under the action of an element of a predetermined mass which is subjected to the acceleration and designed so as to supply the plate with a force normal to its surface, proportional to the normal component of the acceleration, the other components not being transmitted to the plate. According to one embodiment, the element supplying the force is an inertia block associated with a ball which alone comes into contact with the plate. According to another embodiment, the force is a pressure force produced by a high density fluid located beneath the plate, this fluid being mercury, which is particularly suitable because of its density. To improve the sensitivity and compensate for the effects of temperature variations, two oscillators are used, each comprising a plate arranged so that the variations in frequency produced by an acceleration in a given direction are in opposite directions to each other. The difference between the frequencies of the two oscillators is measured.

The accelerometer according to the invention can be used in a vehicle, e.g. a car, aircraft, missile, possibly introducing protective elements to prevent fracture of the plates in the case of excessively great acceleration and/or when they are caused to resonate.

The invention relates to an accelerometer using elastic surface waves, comprising:

at least one elastic plate subjected to the acceleration which is to be measured, means for emitting and means for receiving elastic surface waves on at least one side of said plate amplifying means connecting said emitting means and said receiving means, so as to form an oscillator the oscillation frequency of which is modulated by said acceleration means for detecting the modulation of said oscillation frequency an element of a predetermined mass subjected to said acceleration and producing an inertia force which causes deformation of said plate; said force being located in a plane containing the normal to the surface of said plate.

BRIEF DESCRIPTION OF THE DRAWINGS

The invention will be more readily understood from the following description and the accompanying drawings, wherein.

DETAILED DESCRIPTION OF THE PREFERRED EMBODIMENTS

Figure 1:
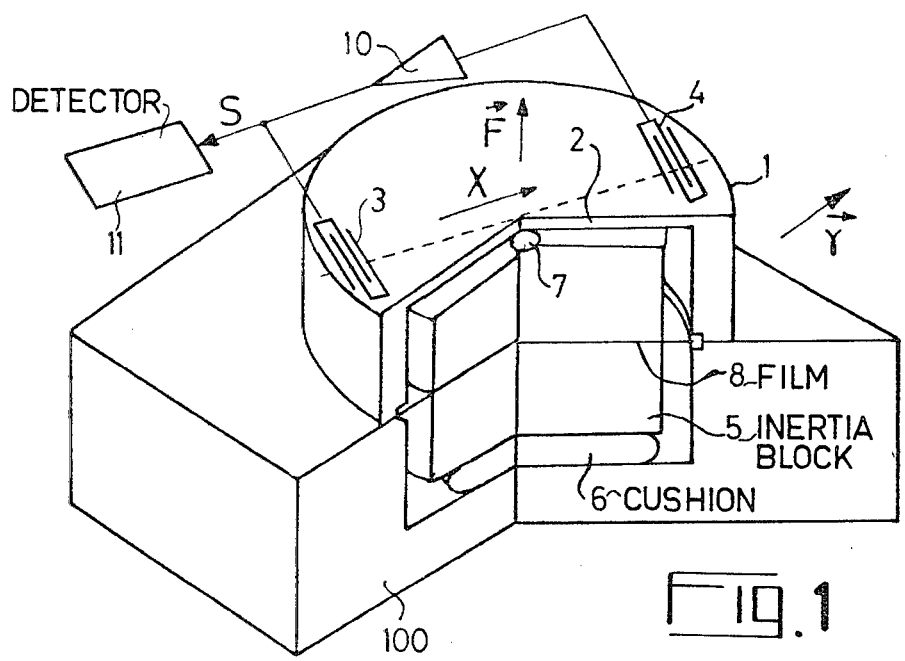
FIG. 1 shows an accelerometer comprising an inertia block and a delay line oscillator.

FIG. 1 shows an exploded view of a delay line oscillator using elastic surface waves. The frequency of this oscillator varies with an acceleration $\vec{\gamma}$ to which the delay line is subjected. The latter consists of a piezoelectric substrate 1, for example with circular faces the central part 2 of which is a fine plate. On one side of the substrate 1 are provided two electromechanical transducers 3, 4 consisting of conducting electrodes in the form of interlaced combs which have been deposited in diametrically opposed manner so that the elastic waves can be exchanged between the two transducers, on the surface of the plate 2, in a direction X. As a non-restrictive example, the substrate is made of quartz cut along the section Y and the thickness of the plate is of the order of a hundred $\mu$m. Other piezoelectric materials may be used, such as lithium niobate, lithium tantalate and ceramics. An electrical amplifier 10 connects the transducers 3 and 4, its input receiving the signal from the tranducer 4 and its output supplying the transducer 3, which in response emits elastic waves in the direction of the transducer 4. Thanks to the frequency selective electromechanical looping thus obtained, the amplifier 10 starts to oscillate and at the output a signal S of frequency f is obtained which depends on the path and phase velocity of the elastic waves and on the gain of the amplifier 10, and which assumes a value $f_o$ at rest. When the plate 2 is subjected to a force $\vec{F}$ normal to its plane, the frequency f varies by a quantity $\Delta f$ which is proportional, at least within a certain range, to the modulus of this force $\vec{F}$. This frequency variation can be measured by a conventional apparatus 11.

The complete apparatus shown in FIG. 1 is a delay line accelerometer. Apart from the delay line described above, the accelerometer comprises means for converting any acceleration $\vec{\gamma}$ to which the apparatus is subjected into a force $\vec{F}$ normal to the surface of the plate 2. These means are a cylindrical inertia block 5 with a predetermined low mass m, which is introduced into the cavity formed between the plate 2 and the frame 100 on which the substrate 1 rests with its peripheral part. This cavity extends into the frame itself and the inertia block 5 rests on the bottom of the cavity provided in the frame via a pneumatic cushion 6. A ball 7 is placed in a recess provided in the centre of the face of the inertia block 5 located opposite the plate 2. The dimensions of the inertia block and the pressure exerted on it by the pneumatic cushion enable the ball to be in constant contact with the membrane. The dimensions of the recess in which the ball is placed enable the ball to roll in the plane of the plate, so that the ball communicates to the membrane a force $\vec{F}$ which is always normal to this plane. When the entire apparatus and hence, in particular, the inertia block and the ball are subjected to the acceleration $\vec{\gamma}$, the force exerted by the ball on the plate is defined by $\vec{F} = m\vec{\gamma}_N$, $\vec{\gamma}_N$ being the normal component of the acceleration, as the two other components of the acceleration are manifested by a rolling movement of the ball but do not act on the plate.

Obviously, to ensure that all the acceleration is transmitted to the ball, the inertia block 5 must not make contact with the substrate 1. To achieve this, its diameter is less than that of the plate and hence of the cavity. Moreover, to prevent any movement of the inertia block in a direction parallel to the plate, one or more flexible suspended films may be provided, such as the one shown by reference numeral 8, which may, for example, be housed between the substrate 1 and the frame 100, thus separating the inertia block 5 into two parts. This film does not interfere with the transmission of the normal acceleration $\vec{\gamma}_N$ but prevents any non-perpendicular movement of the inertia block 5. A test has been carried out with the apparatus shown in FIG. 1, with an inertia block with a mass $m = 1.24$ g, a quartz plate 6 mm in diameter and 155 $\mu$m thick and a resting frequency $f_o$ equal to 105 MHz. A sensitivity of 160 Hz/g was measured, where $g = 9.81$ m/s$^2$. An increase in the frequency $f_o$ and mass m may improve the sensitivity. A substantial improvement consists in placing the entire apparatus in a thermostatically controlled enclosure. In fact, the temperature influences the oscillation frequency and, below a certain acceleration value, the effects due to the variations in ambient temperature, however small, mask the effects due to the acceleration. Another source of frequency variations is the phase noise characterised by the intrinsic stability of the piezoelectric material, and the sensitivity can be increased by increasing the length of the line, thus increasing the delay and reducing the phase noise.

Figure 2:
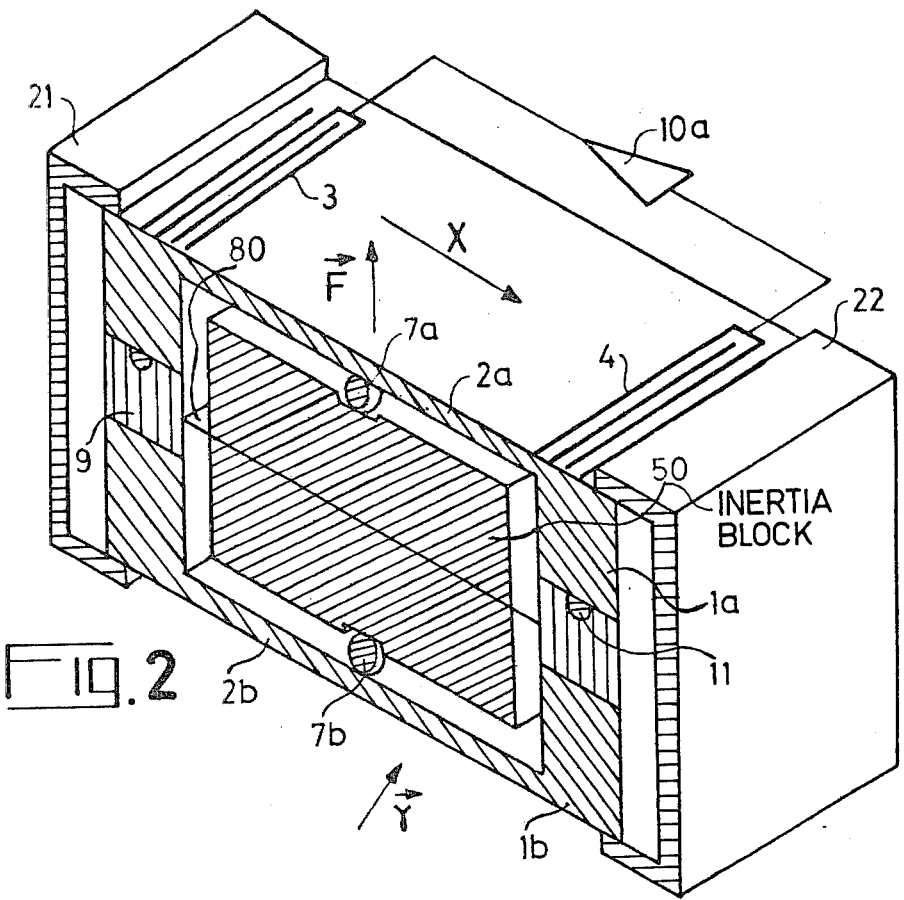
FIGS. 2 and 3 show an accelerometer comprising an inertia block and two delay line oscillators.
Figure 3:
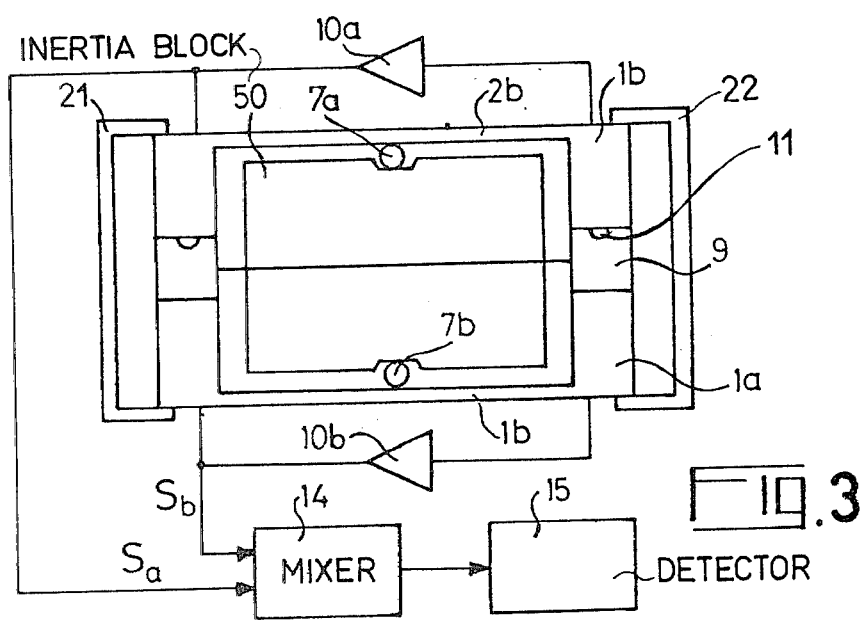

A supplementary method of increasing the sensitivity and also compensating for the effects of temperature is to use two delay lines located on each side of the mass which is subjected to the acceleration. Two apparatus such as the one shown in FIG. 1 may be combined by placing them top to bottom, or else a more compact apparatus may be produced comprising a single mass, as shown in FIG. 2, which shows half an apparatus with a rectangular structure, and FIG. 3, which shows a section through this apparatus. The "pillars" of two parallel delay lines 2a and 2b in the form of bridges are connected via an intermediate member 9 made from a material which does not transmit the elastic waves, so as to prevent any coupling between the two lines. An inertia block 5 is placed in the cavity formed by the two lines. This inertia block carries two balls 7a and 7b which are in contact with the thinner parts 2a and 2b, respectively, of substrates 1a and 1b. The lines 2a and 2b are connected, respectively, to amplifiers 10a and 10b, thus forming two oscillators. The apparatus is constructed so as to be mechanically perfectly symmetrical. To ensure perfect contact between the balls 7a and 7b and the plates 2a and 2b, respectively, and prevent any play between the different parts of the apparatus, particularly the substrates 1a and 1b and the intermediate member 9, the invention proposes the use of two sorts of elastic elements: a toric joint 11 introduced between the member 9 and the pillars of one of the substrates 1a and 1b, on the one hand, and two elastic clamps 21 and 22 which grip the opposing parts of the substrates 2a and 2b and the clamping force of which is such that the toric joint is in a state of compression. The equilibrium of the retaining forces of the two sorts of elements ensures that the balls make contact with the plates, without any danger of crushing them, irrespective of the acceleration to which they are subjected. An acceleration $\vec{\gamma}$ of any orientation produces in the inertia block 50 a force $\vec{F}$ normal to the two surfaces 2a and 2b and induces variations in frequencies $\Delta f_a$ and $\Delta f_b$ which, if the apparatus is perfectly symmetrical, are such that $\Delta f_a = -\Delta f_b$. The signals $S_a$ and $S_b$ coming from the oscillators 10a and 10b, respectively, are picked up, with the frequency $f_a + \Delta f_a$ and $f_b + \Delta f_b$. The signals are mixed in a mixer 14 the output signal of which is filtered so as to obtain a low frequency signal with the frequency $F = f_a - f_b + 2\Delta f_a$. The frequency of this signal is then measured by a conventional apparatus 15. When the oscillation frequency of the oscillators and the mass of the inertia blocks are equal, the sensitivity is multiplied by 2 and the temperature variations produce frequency variations of the same sign in both lines, so that they do not have any effect on the output signal. There may be a problem when two adjacent oscillators oscillate at frequencies close to each other: there is a risk of the frequencies being blocked. In this case, it is preferable to take uncoupling precautions.

Figure 4:
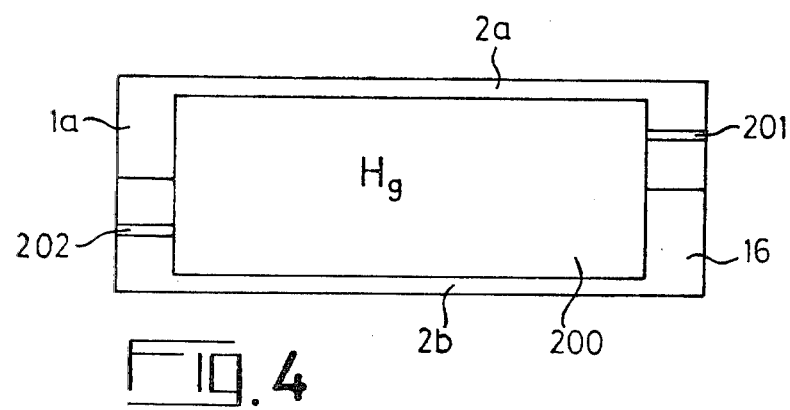
FIG. 4 shows an accelerometer comprising mercury introduced between two delay line oscillators.

In both the embodiments described, the means for converting the acceleration into a force acting on the piezoelectric substrate is a solid, generally metal element. In an alternative embodiment, this element is replaced by a fluid, such as mercury, taking up all the space in the cavity where the solid element was located. This results in the apparatus shown in section in FIG. 4, which is simpler in construction than the others described previously. The two piezoelectric substrates 1a and 1b are placed head to tail, as before, with or without an intermediate member to separate the "pillars", in the case of a rectangular structure, or the thick outer crown, in the case of a circular structure. The mercury is introduced into the cavity 200 formed, for example, through two orifices 201 and 202 drilled in the pillars. As the mercury has a high density, a mass of the same order as that of the solid inertia block 5 or 50 in the previous devices is obtained, i.e. of the order of one gram, in a reduced space (the lines being about 5 mm long). In the absence of acceleration, the two lines are subjected to uniform pressure. When the mercury is subjected to an acceleration $\vec{\gamma}$, pressure gradients are produced on all the walls, which, by integrating the phenomena on the surface of each line, are manifested by an average increase in the pressure force, normal to the surface, for one of the lines and a reduction of equal amplitude for the other line, unless the acceleration is parallel to the surface.

Figure 5:
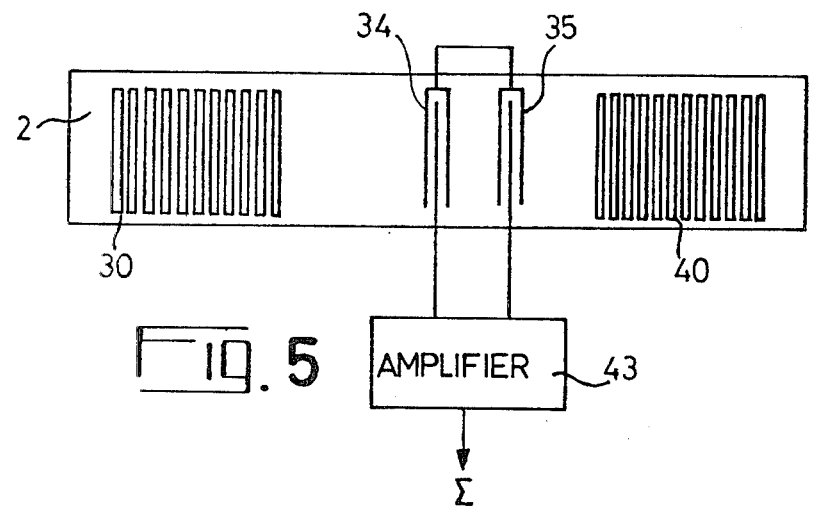
FIG. 5 shows a surface wave resonator which may replace the delay lines of the previous devices.

The apparatus described up to now used delay lines with elastic surface waves propagated in a piezoelectric substrate between two transducers consisting of interlaced combs. It is known that there are other types of oscillators using elastic surface waves, using not delay lines but resonators. FIG. 5 shows a top view of a resonator-type oscillator which may replace the oscillators shown in FIGS. 1 to 4. A piezoelectric plate 2 is provided on one of its surfaces with two reflector networks 30 and 40. The outlines of the networks may be obtained by cutting the plate 2, by localised deposits or by ion bombardment. A system of stationary waves is created between the two networks. Mechano-electrical conversion is obtained by means of one or preferably two transducers 34 and 35. By connecting the transducers 34 and 35 to an amplifier circuit 43, a circuit is obtained which oscillates at a specific frequency depending on the resonant cavity formed between the two reflectors which the networks form. When a normal force is applied to the plate, a deviation in the frequency of the output signal Σ of the circuit 43 is observed.

Figure 6:
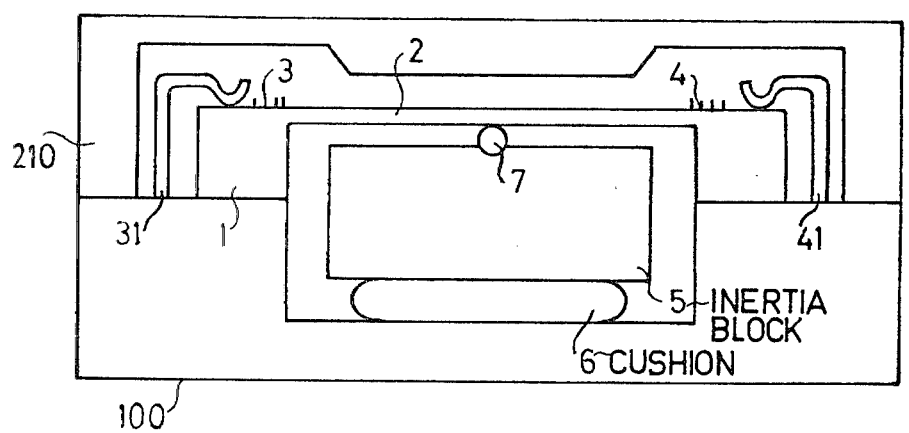
FIG. 6 shows means for protecting an accelerometer according to the invention.

In view of the sensitivity of the apparatus described under any acceleration, including any acceleration which is not intended to be measured, and the fragility of the piezoelectric plates used, precautions must be taken to avoid any deterioration, when the accelerometer is liable to be subjected to acceleration which it cannot tolerate, either because of its amplitude or because of its frequency, if this frequency affects a zone of resonance of the apparatus. Such accelerations may occur during handling or even during the use of the accelerometer if it is placed in an enclosure subject to vibratory stress, such as a car, for example. Tests should be carried out, which may lead to the finding that the spectrum of vibration frequencies to which the accelerometer is subjected comprises resonance frequencies of the accelerometer. Low frequencies, in particular, such as the oscillation amplitudes of the piezoelectric plates, cause fracture of these plates. In this case, protective means should be provided which come into effect only for excessive oscillation amplitudes but do not interfere with the measurement of the acceleration values falling within the specified range. Protective means are diagrammatically shown in section in FIG. 6, by way of example, associated with an accelerometer comprising a delay line of the type described in connection with FIG. 1. Fixed to the frame 100 which supports the piezoelectric substrate 1 there is a solid element 210 overhanging the outer surface of the plate 1, at a very small spacing therefrom, this spacing being such that the plate comes to abut thereon when subjected to excessive accelerations. Elastic spring members 31 and 41 hold the substrate 1 on each side of the tranducers 3 and 4 and cooperate with the element 210 to slow down the movement of the substrate 1 towards the element 210, in order to prevent any violent contact. When the plate 2 is in contact with the member 210, it is impossible to measure any acceleration, but the plate is protected.

The embodiments described are given only as nonrestrictive examples. The accelerometers described are sensitive to the component of the acceleration which is normal to the surface of the plate or parallel plates. Thus, by combining three similar accelerometers the plate or plates of which are in three perpendicular planes, it is possible to obtain a measurement of the three components of any acceleration.

Without going beyond the scope of the invention, the mechanical uncoupling means which transmits to the piezoelectric plate a force which is a function of the acceleration to which it is subjected may have only one degree of liberty instead of two. Thus, the ball may be replaced by a roller which has a line of contact with the plate, preferably in a direction for which the delay line or the resonant cavity has a low or zero response.

The invention is not limited to the embodiments described and represented and various modifications may be made thereto without passing beyond the scope of the invention.

What is claimed is:

1. An accelerometer using elastic surface waves, comprising:
    a frame;
    at least one elastic plate having opposing edges supported in said frame and subjected to the acceleration which is to be measured;
    means for emitting and means for receiving elastic surface waves on a front surface of said plate;
    amplifying means connecting said emitting means and said receiving means, so as to form an oscillator, the oscillation frequency of which is modulated by said acceleration;
    means for detecting the modulation of said oscillation frequency;
    mass means responsive to said acceleration for applying to the back surface of said plate a force causing deformation of said plate, said force being always located in a plane containing the normal to a flat central area of said back surface whatever is the direction of said acceleration; said mass means comprising a solid body having at least one flat central area and a rolling element pinched between said flat central areas.

2. An accelerometer according to claim 1, wherein said emitting and receiving means consist of electromechanical transducers arranged on one surface of said plate and exchanging elastic surface waves in a predetermined direction.

3. An accelerometer according to claim 2, wherein the electromechanical transducers consist of two combs with intercalated teeth.

4. An accelerometer according to claim 1, wherein said emitting and receiving means consist of two networks reflecting elastic surface waves, arranged on one side of said plate and constituting a resonant cavity and at least one electromechanical tranducer located inside said cavity.

5. An accelerometer according to claim 1, wherein said plate consists of a piezoelectric material.

6. An accelerometer according to claim 5, wherein the piezoelectric material is quartz.

7. An accelerometer according to claim 5, wherein the piezoelectric material is lithium niobate.

8. An accelerometer according to claim 1, wherein said rolling element is a roller mechanically connected to said body and having a line or contact with said back surface; said line of contact having a direction of least responsiveness to said acceleration.

9. An accelerometer according to claim 1, wherein said rolling element is a ball mechanically connected to said body and having a point of contact with the plate.

10. An accelerometer according to claim 9, comprising two parallel plates, the solid body being located between the two plates, and two balls located on each side of the solid body and each having a point of contact with the two plates.

* * * * *